US012252839B2

(12) United States Patent
Yi

(10) Patent No.: US 12,252,839 B2
(45) Date of Patent: Mar. 18, 2025

(54) HEATING COMPONENT AND AN IRONING HEAD

(71) Applicant: SHEN ZHEN RONE PHOENIX NEST DESIGN DEVELOPMENT CO ., LTD, Shenzhen (CN)

(72) Inventor: YongJie Yi, Shenzhen (CN)

(73) Assignee: SHEN ZHEN RONE PHOENIX NEST DESIGN DEVELOPMENT CO ., LTD, Shenzhen (CN)

( * ) Notice: Subject to any disclaimer, the term of this patent is extended or adjusted under 35 U.S.C. 154(b) by 12 days.

(21) Appl. No.: 18/213,847

(22) Filed: Jun. 25, 2023

(65) Prior Publication Data

US 2024/0426046 A1 Dec. 26, 2024

(51) Int. Cl.
*D06F 75/24* (2006.01)
*D06F 75/20* (2006.01)
*H05B 3/22* (2006.01)

(52) U.S. Cl.
CPC .............. *D06F 75/24* (2013.01); *D06F 75/20* (2013.01); *H05B 3/22* (2013.01)

(58) Field of Classification Search
CPC .......... D06F 75/24; D06F 75/20; D06F 75/00; D06F 75/08; D06F 75/10; D06F 75/14; D06F 75/18; H05B 3/22
See application file for complete search history.

(56) References Cited

U.S. PATENT DOCUMENTS 2,625,756 A * 1/1953 Stevenson ............... D06F 75/18 38/77.83
2,757,464 A * 8/1956 Youhouse ............... D06F 75/18 38/77.83
10,309,053 B2 * 6/2019 Yagi ........................ D06F 75/18

FOREIGN PATENT DOCUMENTS

CN 201351241 Y * 11/2009
CN 208965285 U * 6/2019 ............. D06F 75/14
CN 210529321 U * 5/2020
CN 218763318 U * 3/2023
FR 2979922 A1 * 3/2013 ............. D06F 75/10

(Continued)

*Primary Examiner* — Ismael Izaguirre
(74) *Attorney, Agent, or Firm* — Olive Law Group, PLLC

(57) ABSTRACT

The invention relates to a heating component and an ironing head thereof, which belongs to the technical field of a garment steamer. The heating component comprises a heat conducting base and a heating element embedded in the heat conducting base and used for heating the heat conducting base, wherein the heat conducting base is provided with a second atomizing cavity, a first atomizing cavity and a third atomizing cavity, the first atomizing cavity is connected with the second atomizing cavity, the second atomizing cavity and the heat conducting base are provided with a water inlet connected with the first atomizing cavity, the heat conducting base is also provided with an air outlet connected with the third atomizing cavity, and a plurality of first bulges or first grooves are arranged on the bottom surfaces of the second atomizing cavity, the first atomizing cavity and the third atomizing cavity. The technical proposal has the advantages of extending the heating stroke and increasing the contact area between water and/or steam and the heat conducting base, thereby increasing the heating area, and ensuring adequate heating vaporization and high ironing temperature.

9 Claims, 6 Drawing Sheets

(56) References Cited

FOREIGN PATENT DOCUMENTS

| | | | | |
|---|---|---|---|---|
| JP | 3145220 U | * | 10/2008 | |
| WO | WO-2016041820 A1 | * | 3/2016 | ............. D06F 75/18 |

* cited by examiner

HEATING COMPONENT AND AN IRONING HEAD

TECHNICAL FIELD

The invention relates to the technical field of a garment steamer, in particular to a heating component and an ironing head thereof.

BACKGROUND ART

The garment steamer is a machine which softens the fiber tissues of clothes by constantly contacting clothes with hot steam. The garment steamer enables the clothes to be flat and smooth by pulling and pressing and jets at the wrinkles of the clothes without an ironing board, eliminating the tedious steps of conventional ironing. The hot steam has the effects of cleaning and disinfecting, and the garment steamer is used in clothing stores, hostels, hotels, families, etc. For example, the contents disclosed in the specification and drawings of CN109989249A, an easy-to-clean garment steamer, show that there is only one vaporization cavity, which makes it insufficient to vaporize the liquid, resulting in insufficient ironing temperature and poor ironing effect.

Content of Invention

Aiming at the defects and deficiencies of the prior art, the invention provides a heating component and an ironing head thereof, which has the advantages of extending the heating stroke and increasing the contact area between water and/or steam and the heat conducting base, thereby increasing the heating area, and ensuring adequate heating vaporization and high ironing temperature.

To realize the above purpose, the invention adopts the following technical proposal: a heating component comprises a heat conducting base and a heating element embedded in the heat conducting base and used for heating the heat conducting base, wherein the heat conducting base is provided with a second atomizing cavity, a first atomizing cavity and a third atomizing cavity, the first atomizing cavity is connected with the second atomizing cavity, the second atomizing cavity and the heat conducting base are provided with a water inlet connected with the first atomizing cavity, the heat conducting base is also provided with an air outlet connected with the third atomizing cavity, and a plurality of first bulges or first grooves are arranged on the bottom surfaces of the second atomizing cavity, the first atomizing cavity and the third atomizing cavity.

A plurality of second bulges or second grooves are arranged downward on the top surfaces of the first atomizing cavity and the second atomizing cavity.

A plurality of division plates for dividing the second atomizing cavity into a plurality of end-to-end connected cavities are arranged in the second atomizing cavity.

A plurality of first division plates for dividing the third atomizing cavity into a plurality of end-to-end connected cavities are arranged in the third atomizing cavity.

The heat conducting base comprises a main body, a first vaporization cap covered on the top of the main body and used for sealing the second atomizing cavity, and a second vaporization cap covered at the bottom of main body and used for sealing the first atomizing cavity and the third atomizing cavity, wherein the heating element is embedded in the main body, the second atomizing cavity is arranged on the main body and located on the top of the heating element, the first atomizing cavity and the third atomizing cavity are arranged on the main body and located on the bottom of the heating element, and the first atomizing cavity is located in the third atomizing cavity.

An isolating part is convexly arranged from top to bottom in the third atomizing cavity where the bottom of the main body is located, the first atomizing cavity is enclosed by the isolating part, and a boss part capable of being covered in the first atomizing cavity is arranged on the second vaporization cap.

A limit part is arranged on the inside wall of the first atomizing cavity on the isolating part.

A first plug-in part is arranged in the second atomizing cavity of the main body, a plug-in slot is arranged on the first plug-in part, a second plug-in part plugged in the plug-in slot is arranged on the bottom surface of the first vaporization cap, and a water inlet passes through the plug-in part and the second plug-in part from top to bottom and is connected with the first atomizing cavity.

An annular first slot is arranged at an opening near the second atomizing cavity on the top surface of the main body, an annular second slot is arranged at an opening near the third atomizing cavity on the bottom surface of the main body, a first annular plug-in block capable of being plugged in the first slot is arranged on the first vaporization cap, and a second annular plug-in block capable of being plugged in the second slot is arranged on the second vaporization cap.

A steam storage cavity is arranged under the boss part on the bottom surface of the second vaporization cap and is connected with the third atomizing cavity through the air outlet, a sealing cap is covered on the steam storage cavity, a plurality of positioning columns are convexly arranged at the bottom of the sealing cap, and outlet holes running through the positioning columns and connected with the steam storage cavity are arranged on the sealing cap.

An ironing head comprises the heating component, a housing and a heat conducting base plate, wherein the heating component is arranged in the housing, and the bottom thereof is in contact with the heat conducting base plate.

By adopting the technical proposal, the invention has the following beneficial effects: a heating component applied to an ironing head comprises a heat conducting base and a heating element; the heat conducting base is provided with a second atomizing cavity, a first atomizing cavity and a third atomizing cavity, the first atomizing cavity is connected with the second atomizing cavity, the second atomizing cavity and the heat conducting base are provided with a water inlet connected with the first atomizing cavity, an air outlet connected with the third atomizing cavity is arranged on the heat conducting base, a plurality of first bulges or first grooves are arranged on the bottom surfaces of the second atomizing cavity, the first atomizing cavity and the third atomizing cavity, and the heating element is embedded in the heat conducting base and used for heating the heat conducting base. A first vaporization cavity, a second vaporization cavity and a third vaporization cavity are arranged in the heat conducting base of the proposal to extend the heating stroke and ensure adequate water vaporization, and a plurality of first bulges or first grooves are arranged to increase the contact area between water and/or steam and the heat conducting base to further ensure adequate water vaporization, so that the ironing head has high enough temperature and good vaporization effect to achieve high ironing temperature and good ironing effect.

DESCRIPTION OF DRAWINGS

To describe the embodiments of the invention or the technical proposal in the prior art more clearly, the drawings required for the description of the embodiments or the prior art are briefly introduced below. Obviously, the drawings described below are only some embodiments of the invention. For ordinary technicians in the field, other drawings can also be obtained from these drawings without creative labor.

Figure 1:
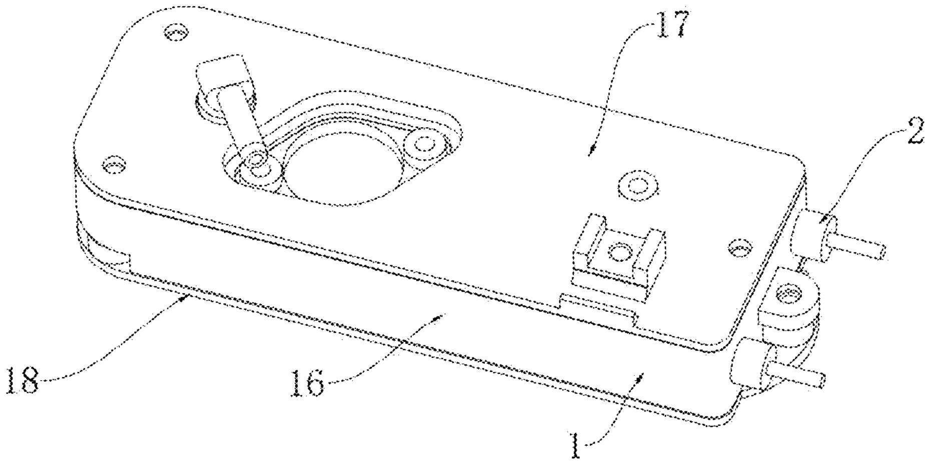
FIG. 1 is a structural diagram for the heating component of the invention.

Reference signs: 1. Heat conducting base; a. First atomizing cavity; b. Second atomizing cavity; c. Third atomizing cavity; d. Water inlet; e. Air outlet; 11. First bulge; 2. Heating element; 12. Second bulge; 13. Division plate; 14. First division plate; 15. Separating plate; 16. Main body; 17. First vaporization cap; 18. Second vaporization cap; 161. Isolating part; 181. Boss part; 162. Limit part; 171. First plug-in block; f. First slot; g. Second slot; 182. Second plug-in block; 163. First plug-in part; h. Plug-in slot; 172. Second plug-in part; i. First through hole; j. Second through hole; k. Steam storage cavity; 3. Sealing cap; 31. Positioning column; m. Air outlet; 4. Housing; 5. Heat conducting base plate; n. Positioning hole; 41. Heat insulation inner shell.

DETAILED DESCRIPTION

The invention is further described in detail in combination with the drawings.

This embodiment is only an interpretation of the invention, but not a limitation to the invention. After reading the specification, the technicians in the field may modify the embodiment as necessary without creative contributions, but it will be protected by the patent law if it is within the scope of the claims of the invention.

The embodiment relates to a heating component, which comprises a heat conducting base 1 and a heating element 2 as shown in FIG. 1 to FIG. 4, FIG. 7 and FIG. 8. The heat conducting base 1 is provided with a second atomizing cavity b, a first atomizing cavity a and a third atomizing cavity c, the first atomizing cavity a is connected with the second atomizing cavity b, the second atomizing cavity b and the heat conducting base 1 are provided with a water inlet d connected with the first atomizing cavity a, the heat conducting base 1 is also provided with an air outlet e connected with the third atomizing cavity c, and a plurality of first bulges 11 or first grooves are arranged on the bottom surfaces of the second atomizing cavity b, the first atomizing cavity a and the third atomizing cavity c. When the first bulges 11 are arranged on the first atomizing cavity a, the second atomizing cavity b and the third atomizing cavity c, the first bulges 11 can be conical or semi-circular; when the first grooves are arranged on the first atomizing cavity a, the second atomizing cavity b and the third atomizing cavity c, the first grooves can be conical, polygonal or semi-circular, so that the contact area between water or steam in the atomizing cavities and the heat conducting matrix is increased, and the heating element is embedded in the heat conducting base 1 and used for heating the heat conducting base 1. Preferably, the heating element 2 is U-shaped, both ends of which are exposed to one side of the heat conducting matrix. In the embodiment, the heat conducting base 1 is made of metal with good thermal conductivity, which can be copper, aluminum, copper alloy or aluminum alloy, etc., so that the heat is transferred to the whole heat conducting base 1 when the heating element 2 heats up, and therefore the whole heat conducting base 1 is in a heating state.

It should be noted that water enters the first atomizing cavity a from the water inlet d, the heating element 2 heats the heat conducting base 1 to realize water heating and vaporization, the heated water and/or steam pass through the second atomizing cavity b and the third atomizing cavity c successively to realize the continuous water and/or steam heating, the first atomizing cavity a, the second atomizing cavity b and the third atomizing cavity c are arranged in the heat conducting base 1 to extend the heating stroke and therefore ensure that water is fully vaporized, the first bulges 11 or the first grooves are arranged at the bottom of the atomizing cavities to increase the contact area between water and/or steam and the heat conducting base 1, and further ensure adequate vaporization, high enough temperature, good vaporization effect, high ironing temperature and good ironing effect.

Preferably, to further increase the contact area between the heat conducting base 1 and water and/or steam and further ensure the water and/or steam heating vaporization of the heating component, a plurality of second bulges 12 or second grooves are arranged downward on the top surfaces of the first atomizing cavity a and the second atomizing cavity b. When the second bulges 12 are arranged on the first atomizing cavity a and the second atomizing cavity b, the second bulges 12 can be conical or semi-circular; when the second grooves are arranged on the first atomizing cavity a, the second atomizing cavity b and the third atomizing cavity c, the second bulges 12 can be conical, polygonal or semi-circular. In other embodiments, the second bulges 12 or grooves are arranged on the top surface of the third atomizing cavity.

Figure 3:
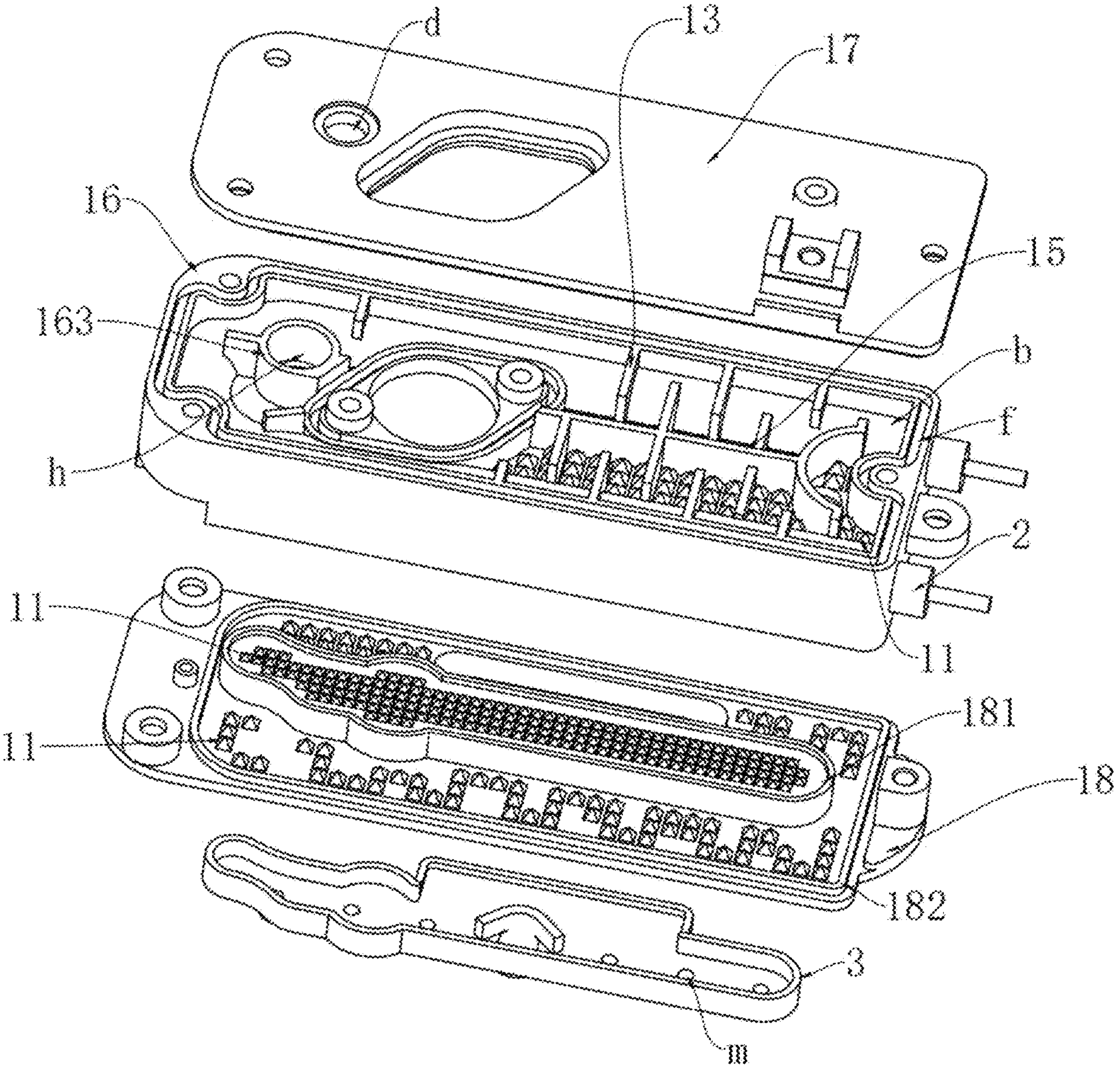
FIG. 3 is an explosive view for the heating component.

Preferably, as shown in FIG. 3, to further increase the adequate water and/or steam vaporization effect in the second atomizing cavity b, a plurality of division plates 13 for dividing the second atomizing cavity (b into a plurality of end-to-end connected cavities are arranged in the second atomizing cavity b, the division plates 13 are arranged on two inner walls of the second atomizing cavity b, and the two inner walls are arranged oppositely, and the division plates 13 on both sides are staggered or symmetrical. When the division plates 13 on the two inner walls of the second atomizing cavity b are symmetrical, a separating plate 15 is arranged on the center line of the two inner walls of the second atomizing cavity b on which the division plates 13 are arranged, and the division plates 13 staggered with the division plates 13 on the two inner walls of the second atomizing cavity b are respectively arranged on both sides of the separating plate 15. The water and/or steam heating stroke is further increased while the contact area between water and/or steam and the heat conducting base 1 in the second atomizing cavity b is further increased by providing the division plates 13 in the second atomizing cavity b.

Preferably, as shown in FIG. 3, FIG. 4, FIG. 7 and FIG. 8, the heat conducting base 1 comprises a main body 16, a first vaporization cap 17 and a second vaporization cap 18. The heating element 2 is embedded in the main body 16, the second atomizing cavity b is arranged on the main body 16 and located on the top of the heating element2, the first atomizing cavity a and the third atomizing cavity c are arranged on the main body 16 and located at the bottom of the heating element 2, and the first atomizing cavity a is located in the third atomizing cavity c. The first vaporization cap 17 is arranged on top of the main body 16 and used for sealing the second atomizing cavity b. The second vaporization cap 18 is arranged at the bottom of the main body 16 and used for sealing the first atomizing cavity a and the third atomizing cavity c. In the embodiment, the main body 16, the first atomization cap and the second atomization cap are made of metal materials. In the embodiment, to achieve the sealing of the third atomizing cavity c by the second vaporization cap 18, an isolating part 161 is convexly arranged from top to bottom in the third atomizing cavity c where the bottom of the main body 16 is located, the first atomizing cavity a is enclosed by the isolating part 161, a boss part 181 capable of being covered in the first atomizing cavity a is arranged on the second vaporization cap 18, and a limit part 162 is arranged on the inside wall of the first atomizing cavity a on the isolating part 161. Preferably, the limit part 162 is arranged to prevent excessive insertion of the boss part 181 to ensure space for the first atomizing cavity a.

Figure 4:
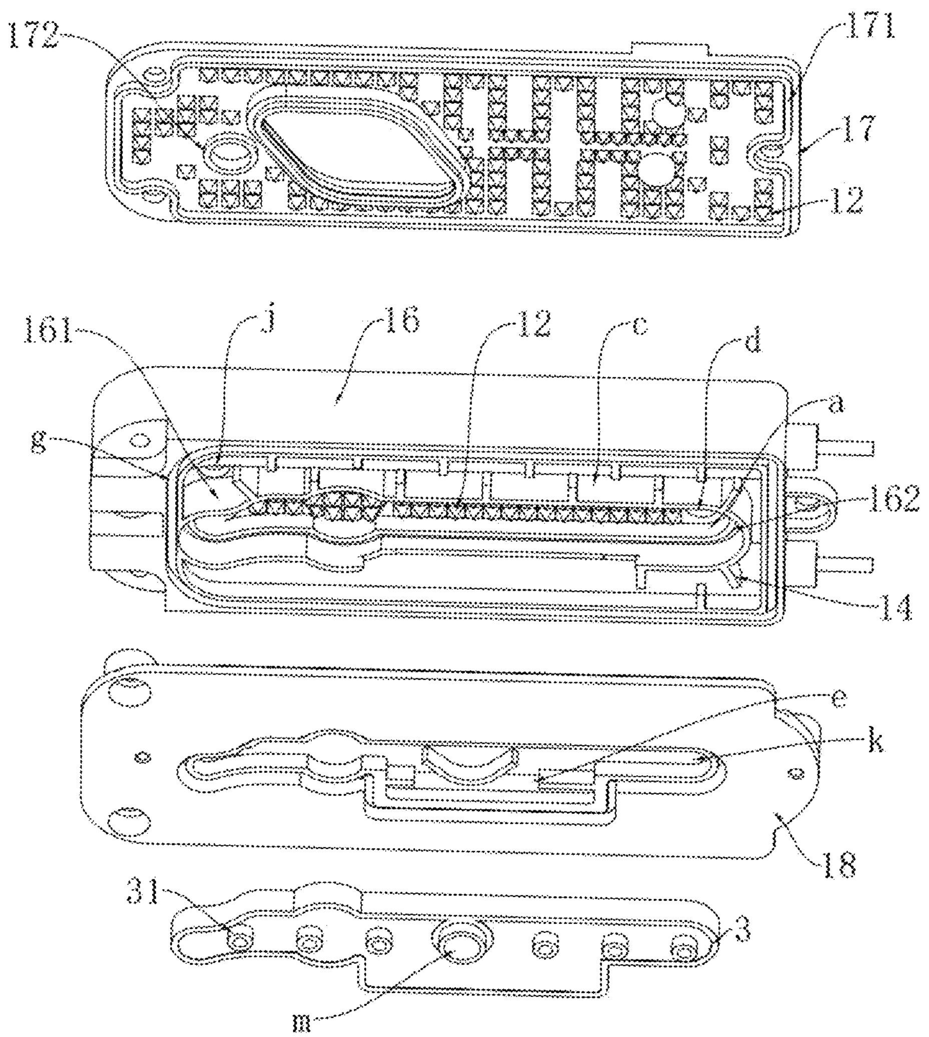
FIG. 4 is an explosive view for the heating component in another direction.
Figure 5:
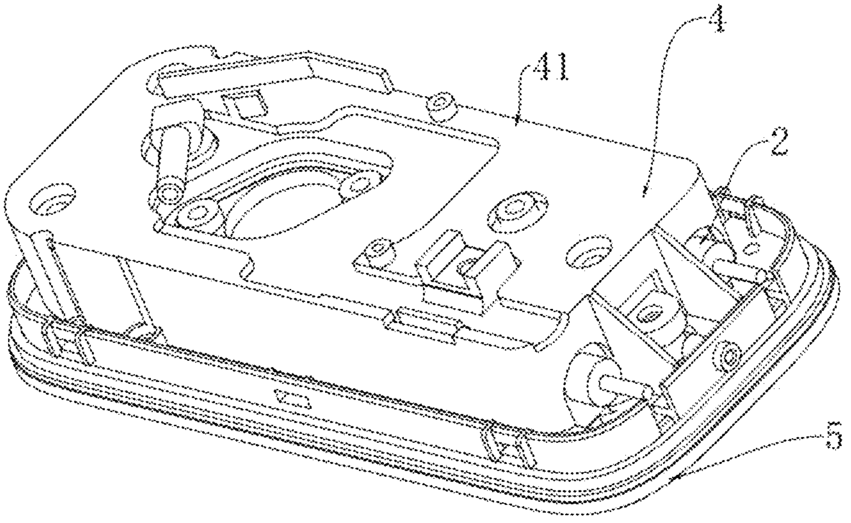
FIG. 5 is a structural diagram for the ironing head of the invention.
Figure 6:
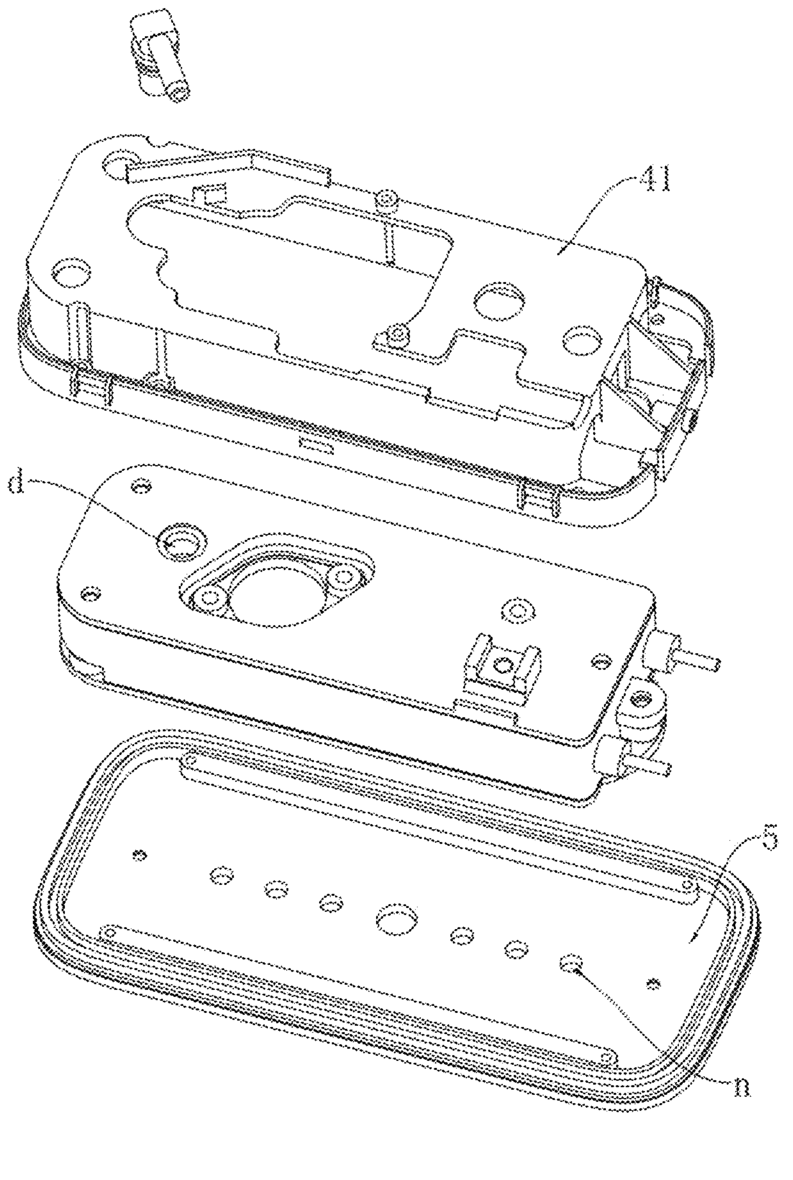
FIG. 6 is an explosive view for the ironing head.
Figure 7:
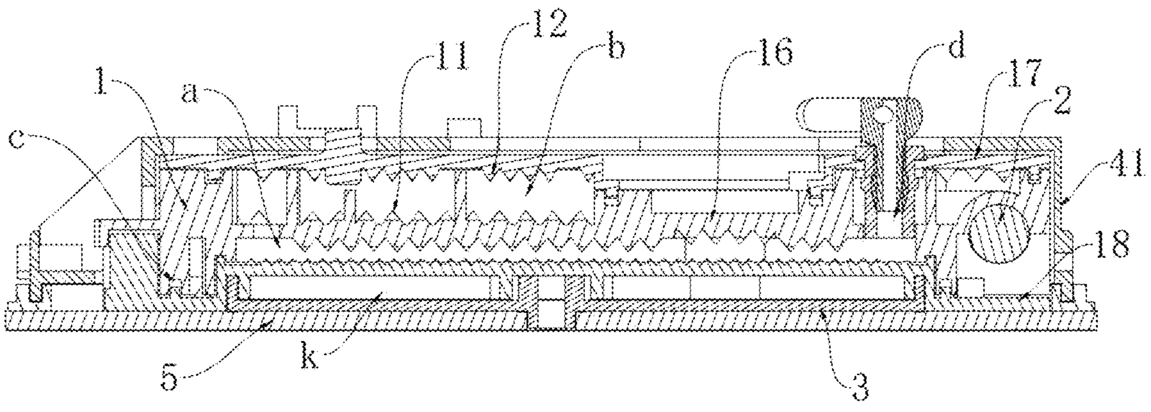
FIG. 7 is a section view for the ironing head.
Figure 8:
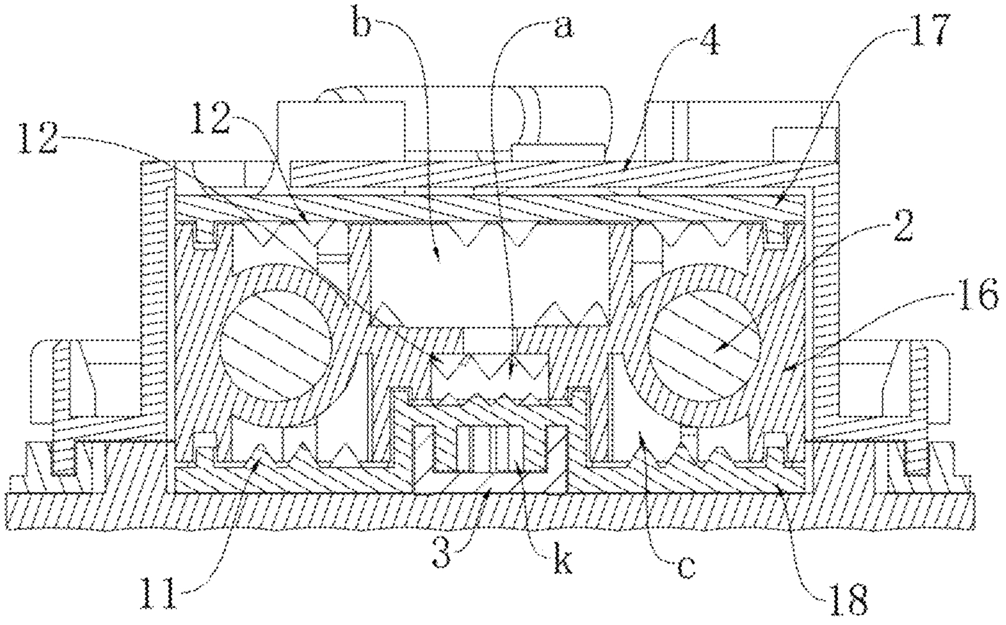
FIG. 8 is another section view for the ironing head.

Preferably, as shown in FIG. 4, to further extend the travel of water and/or steam in the third atomizing cavity c, one end of the outer wall of the isolating part 161 coincides with one end of the inner wall of the third atomizing cavity c, and a gap is provided between the other end of the outer wall of the isolating part 161 and the other end of the inner wall of the third atomizing cavity c to make the third atomizing cavity c U-shaped, the connection between the second atomizing cavity b and the third atomizing cavity c is located on one side of the U-shaped atomizing cavity and away from the gap end, the air outlet e is located on the other side of the U-shaped atomizing cavity, and a plurality of first division plates 14 for dividing the third atomizing cavity c into a plurality of end-to-end connected cavities are staggered on the outer wall of the isolating part 161 and the inner wall of the third atomizing cavity c to further extend the travel of water and/or steam in the third atomizing cavity c while increasing the contact area between water and/or steam and the main body 16, thus improving the heating efficiency.

Preferably, to facilitate the fixing or removal of the first vaporization cap 17 and the second vaporization cap 18 from the main body 16 for cleaning the atomizing cavities, the first vaporization cap 17 and the second vaporization cap 18 are fixed to the main body 16 through bolts.

Preferably, as shown in FIG. 3, FIG. 4, FIG. 7 and FIG. 8, to seal the second atomizing cavity b and the third atomizing cavity c respectively by the first vaporization cap 17 and the second vaporization cap 18 and avoid the spread or leakage of water and/or steam to the surrounding areas, a first annular plug-in block 171 capable of being plugged in the first slot f is arranged on the first vaporization cap 17, an annular first slot f is arranged at an opening near the second atomizing cavity b on the top surface of the main body (16) on the second vaporization cap 18, an annular second slot g is arranged at an opening near the third atomizing cavity c on the bottom surface of the main body 16, and a second annular plug-in block 182 capable of being plugged in the second slot h is arranged on the second vaporization cap 18.

Preferably, a first plug-in part 163 is arranged in the second atomizing cavity b of the main body 16, a plug-in slot h is arranged on the first plug-in part 163, the slot h is connected with a water inlet d and is arranged concentrically, a second plug-in part 172 plugged in the plug-in slot h is arranged on the bottom surface of the first vaporization cap 17, and the water inlet d passes through the plug-in part 163 and the second plug-in part 172 from top to bottom and is connected with the first atomizing cavity a to prevent water from entering the second atomizing cavity b from the water inlet d. In the embodiment, a first through hole i connected with the first atomizing cavity a and the second atomizing cavity b is arranged on the top of the first atomizing cavity a on the main body 16 and is located at one end away from the water inlet d, a second through hole j connected with the second atomizing cavity b and the third atomizing cavity c is arranged at the bottom of the second atomizing cavity b on the main body 16 and is located at one end near the first plug-in part163 and at one end away from the first through hole I, and the division plate 13 is located between the first through hole i and the second through hole j. The formation of water and/or steam is extended by arranging the first atomizing cavity a, the second atomizing cavity b, the third atomizing cavity c, the division plate 13, the first through hole i and the second through hole j, thereby achieving more adequate heating vaporization, high enough temperature, good vaporization effect, high ironing temperature and good ironing effect.

Figure 2:
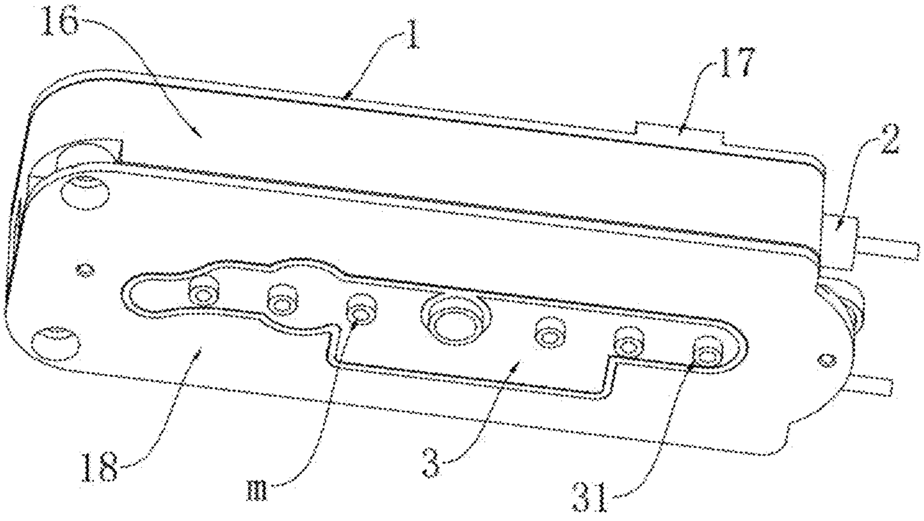
FIG. 2 is a structural diagram for the heating component of the invention in another direction.

Preferably, as shown in FIG. 2 and FIG. 4, to facilitate the positioning and assembly of the heating component and the external assembly as well as the ejection of heated steam, a steam storage cavity k is arranged under the boss part 181 on the bottom surface of the second vaporization cap 18 and is connected with the third atomizing cavity c through the air outlet e, a sealing cap 3 is covered on the steam storage cavity k, a plurality of positioning columns 31 are convexly arranged at the bottom of the sealing cap 3, and outlet holes m running through the positioning columns 31 and connected with the steam storage cavity k are arranged on the sealing cap 3.

As shown in FIG. 5 to FIG. 8, an ironing head comprises the heating component, a housing 4 and a heat conducting base plate 5, wherein the heating component is arranged in the housing 4, and the bottom thereof is in contact with the heat conducting base plate 5. In the embodiment, the heat conducting base plate 5 is made of metal with good thermal conductivity, which can be copper, aluminum, copper alloy or aluminum alloy, etc. The top surface of the heat conducting base plate 5 is in contact with the bottom surface of the second vaporization cap 18, so that the heating element 2 can quickly heat the heat conducting base plate 5, thus achieving the effect of ironing clothes. To facilitate the assembly of the heating component and the heat conducting base plate 5 and enable the ironing head to jet hot steam, positioning holes n for the positioning column 31 to be inserted one by one are arranged on the heat conducting base plate 5. In the embodiment, the heat conducting base plate 5 is fixed to the heating component by screws. The heating component of the housing 4 is fixed by screws or a fastening structure. In the embodiment, the housing 4 comprises a heat insulation inner shell 41 and an outer shell (not shown in the drawing), the heat insulation inner shell 41 is covered outside the heating component and is fixed to the heat conducting base plate 5 and the heating component by screws, the outer shell is covered outside the heat insulation inner shell 41, and the bottom edge of the outer shell is plugged in the slot on the top edge of the base plate. Preferably, the heat insulation inner shell 41 is made of rigid heat insulating materials.

The above is only used to describe the technical proposal of the invention and not to restrict it, and is a further detailed description of the invention in combination with alternative embodiments. Other modifications or equivalent replacements made by ordinary technicians in the field to the technical proposal of the invention should be covered by the scope of the claims of the invention as long as they do not deviate from the spirit and scope of the technical proposal of the invention.

The invention claimed is:

1. A heating component, wherein the heating component comprises a heat conducting base and a heating element embedded in the heat conducting base and used for heating the heat conducting base;

wherein the heat conducting base is provided with a second atomizing cavity, a first atomizing cavity and a third atomizing cavity the heat conducting base further comprises a main body, a first vaporization cap covered on the top of the main body and used for sealing the second atomizing cavity, and a second vaporization cap covered at the bottom of main body and used for sealing the first atomizing cavity and the third atomizing cavity, wherein the heating element is embedded in the main body, the second atomizing cavity is arranged on the main body and located on the top of the heating element, the first atomizing cavity and the third atomizing cavity are arranged on the main body and located on the bottom of the heating element, and the first atomizing cavity is located in the third atomizing cavity;

wherein the heat conducting base is also provided with an air outlet connected with the third atomizing cavity, and a plurality of first bulges or first grooves are arranged on the bottom surfaces of the second atomizing cavity, the first atomizing cavity and the third atomizing cavity;

wherein an isolating part is convexly arranged from top to bottom in the third atomizing cavity where the bottom of the main body is located, the first atomizing cavity is enclosed by the isolating part, and a boss part capable of being covered in the first atomizing cavity is arranged on the second vaporization cap.

2. The heating component according to claim 1, wherein the first atomizing cavity is connected with the second atomizing cavity, the second atomizing cavity and the heat conducting base are provided with a water inlet connected with the first atomizing cavity; a plurality of second bulges or second grooves are arranged downward on the top surfaces of the first atomizing cavity and the second atomizing cavity.

3. The heating component according to claim 1, wherein a plurality of division plates for dividing the second atomizing cavity into a plurality of end-to-end connected cavities are arranged in the second atomizing cavity.

4. The heating component according to claim 1, wherein a plurality of first division plates for dividing the third atomizing cavity into a plurality of end-to-end connected cavities are arranged in the third atomizing cavity.

5. The heating component according to claim 1, wherein a limit part is arranged on the inside wall of the first atomizing cavity on the isolating part.

6. The heating component according to claim 1, wherein a first plug-in part is arranged in the second atomizing cavity of the main body, a plug-in slot is arranged on the first plug-in part, a second plug-in part plugged in the plug-in slot is arranged on the bottom surface of the first vaporization cap, and a water inlet passes through the plug-in part and the second plug-in part from top to bottom and is connected with the first atomizing cavity.

7. The heating component according to claim 1, wherein an annular first slot is arranged at an opening near the second atomizing cavity on the top surface of the main body, an annular second slot is arranged at an opening near the third atomizing cavity on the bottom surface of the main body, a first annular plug-in block capable of being plugged in the first slot is arranged on the first vaporization cap, and a second annular plug-in block capable of being plugged in the second slot is arranged on the second vaporization cap.

8. The heating component according to claim 1, wherein a steam storage cavity is arranged under the boss part on the bottom surface of the second vaporization cap and is connected with the third atomizing cavity through the air outlet, a sealing cap is covered on the steam storage cavity, a plurality of positioning columns are convexly arranged at the bottom of the sealing cap, and outlet holes running through the positioning columns and connected with the steam storage cavity are arranged on the sealing cap.

9. An ironing head, wherein the ironing head comprises the heating component in claim 1, a housing and a heat conducting base plate, wherein the heating component is arranged in the housing and the bottom thereof is in contact with the heat conducting base plate.

* * * * *